United States Patent [19]

Persson

[11] 4,063,827
[45] Dec. 20, 1977

[54] HAND-HELD APPLICATOR DEVICE FOR APPLYING A LIQUID LUBRICANT TO THE END PORTION OF A TUBE

[75] Inventor: Bengt Arne Persson, Djursholm, Sweden

[73] Assignee: B A Installationsutveckling AB, Djursholm, Sweden

[21] Appl. No.: 680,554

[22] Filed: Apr. 27, 1976

[30] Foreign Application Priority Data

May 12, 1975 Sweden .............................. 7505455

[51] Int. Cl.² .................. A46B 11/00; A46B 15/00
[52] U.S. Cl. .................................. 401/10; 401/199; 15/104.92; 118/3
[58] Field of Search ........................ 401/9–11, 401/198, 199; 15/104.03, 104.04, 104.05, 104.92; 118/10, 11, 3, 264, 266, 267, 268

[56] References Cited

U.S. PATENT DOCUMENTS

| | | | |
|---|---|---|---|
| 1,978,716 | 10/1934 | Morehouse | 401/10 |
| 2,658,474 | 11/1953 | Sengbusch | 118/204 |
| 2,767,417 | 10/1956 | Amen | 401/9 |
| 3,765,983 | 10/1973 | Putzier | 15/293 |
| 3,889,628 | 6/1975 | Usab | 118/3 |

Primary Examiner—Stephen C. Pellegrino
Attorney, Agent, or Firm—Sughrue, Rothwell, Mion, Zinn and Macpeak

[57] ABSTRACT

A hand held liquid lubricant applicator device for applying liquid lubricant to the surface of the end portion of a tube. The applicator essentially comprises an open container for holding a liquid lubricant, an inverted closed end tubular insert member positioned within the container, a tubular applicator positioned between the container and the insert member, and means to prevent excess wetting of the applicator and spillage of the liquid.

5 Claims, 6 Drawing Figures

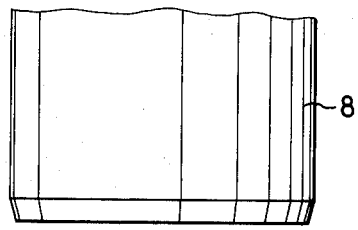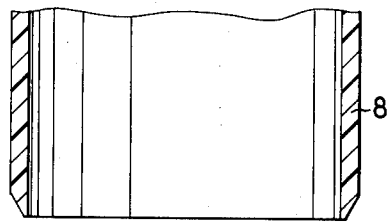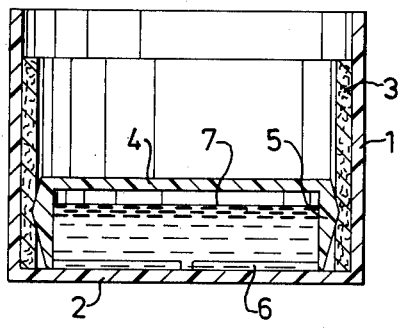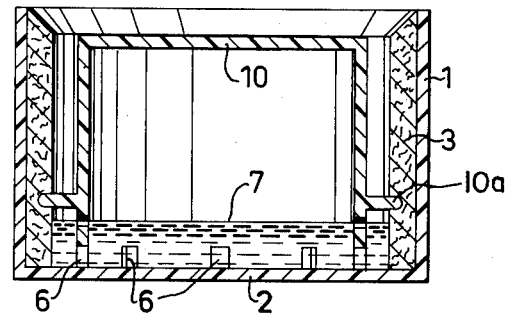

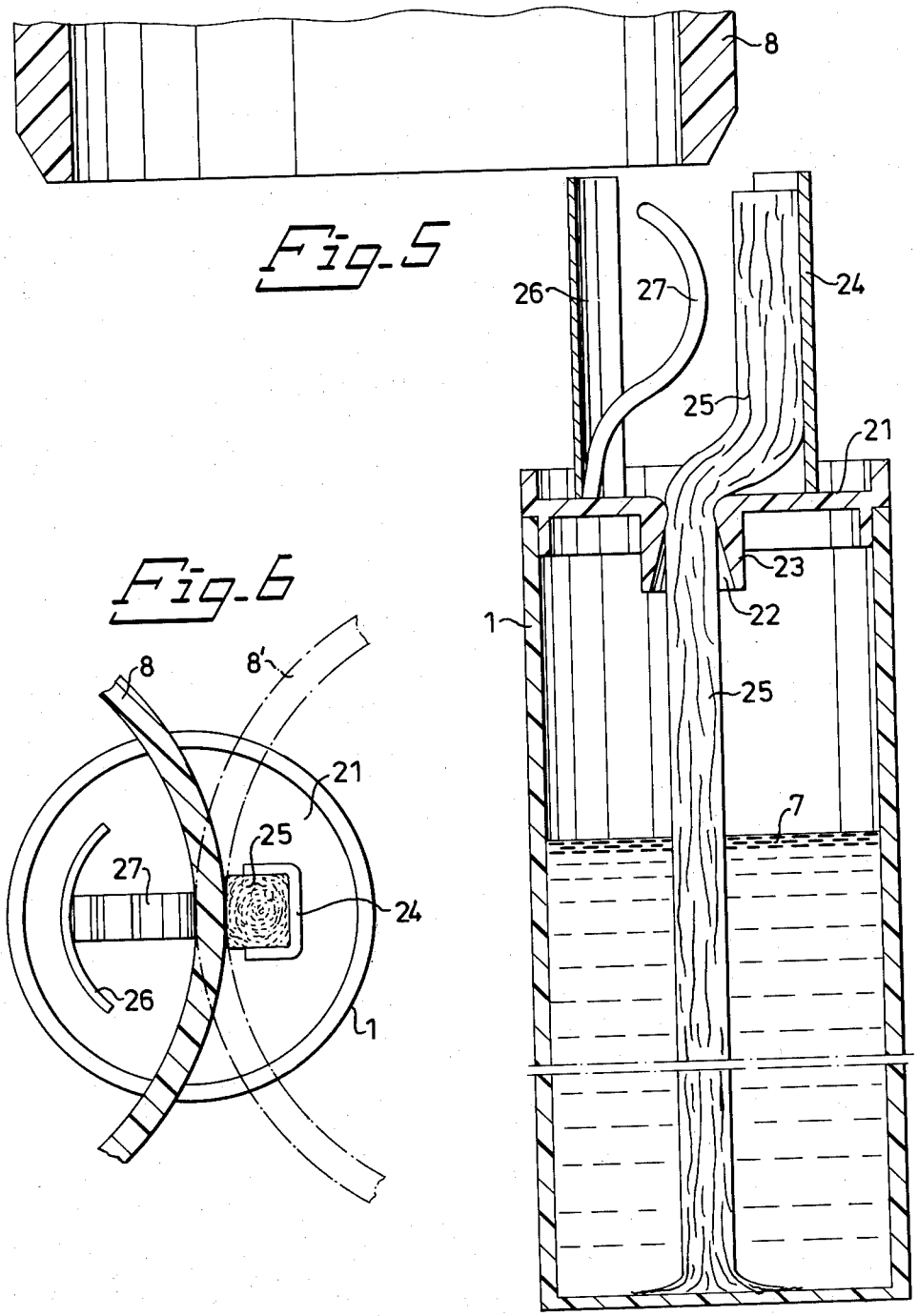

HAND-HELD APPLICATOR DEVICE FOR APPLYING A LIQUID LUBRICANT TO THE END PORTION OF A TUBE

The present invention relates to a hand-held applicator device for applying a liquid lubricant to the surface of the end portion of a tube which in connection with a joining of this end portion to another end portion of a tube by means of a socket end and a sealing ring is adapted to sealingly and slidingly engage said sealing ring. As a rule the tubes consist of plastic, one of which being shaped with a socket end in which a sealing ring is adapted in an annular groove in the inner surface of the socket end. When a tube end is inserted into the socket end of the other tube the sealing ring will be exerted to heavy friction forces. In order to reduce said forces it is necessary to use a film of lubricant on the end portion of the tube. The lucricant is usally a consistent paste and is applied by using the fingers or an oil applied by spraying. Spraying is the preferred and the cleanest method although rather expensive.

As an alternative the sealing ring may be adopted in an annular groove in the outer surface of the end portion of a tube. This end portion should be inserted into a socket end of another tube and in this case the inner surface of the socket end should be provided with lubricant.

The object of the invention is to provide a device permitting a rapid and uncomplicated applying of the lubricant which device is also less lubricant-consuming than the known devices.

According to the invention this problem will be solved by a container enclosing said lubricant and comprising a wall provided with an opening through which an applicator member extends consisting of a lubricant absorbing material and comprising an inner portion positioned in the interior of the container, an intermediate portion positioned in said opening and being compressed by the edges of said opening, and an essentially straight portion protruding from the opening of said container wall and having a length at least equal to the length of the tube portion surface to be provided with a lubricant film and presenting a lubricant applicator surface.

The applicator member may be tubular and the opening ring-shaped in which case the diameter of the applicator member corresponds to the inside or outside diameter of the end portion of the tube depending on which side of the tube is to be provided with a lubricant film and when the applicator member is moved into or onto the end portion of tube a suitable amount of lubricant is applied to the intended surface of the tube end portion.

The edges of the opening in the container wall is adapted to compress the applicator member and, in addition, the container is designed in known manner to prevent the lubricant from escaping from the interior of the container when the container is laid down or positioned upside down even for a long time.

According to a preferred embodiment of the invention at least the protruding portion of the applicator member is rod-shaped permitting the lubricant to be applied to the inner or outer surface of a tube end portion by pressing the applicator member against said surface and turning the applicator member around said end portion. This device can be used independent of the diameter of the tube and the wall thickness.

The invention will be further described by way of example with reference to different embodiments of the invention shown in the accompanying drawings, in which FIG. 1 shows a longitudinal section of a first embodiment of the invention and an end portion of a tube, the outside surface of which being applied with the lubricant, FIGS. 2 and 3 show longitudinal sections of two further embodiments of the invention, FIG. 4 shows a longitudinal section of a device according to an embodiment of the invention and a tube portion provided with a socket end, the inner surface of which being the one to be provided with a lubricant, and FIGS. 5 and 6 show a longitudinal section and a cross section, respectively, of a preferred embodiment of the invention.

The device shown in FIG. 1 comprises a container with for instance a cylindrical wall 1 and a bottom portion 2, in which container a tubular cotton wick 3 is attached to the wall 1 and a circular lid 4 is pressed against the wick 3 at a distance from the bottom 2 defined by a flange 5. The flange 5 is provided with recesses 6 adjacent the bottom 2 permitting a liquid lubricant in the container with the level 7 to be absorbed by the wick 3, and when an end portion 8 of a tube is moved into the container towards the lid 4 and is withdrawn the outside of the end portion of the tube is supplied with a film of the lubricant.

The container can for a short time be tilted or positioned upside down with the lubricant retained in the space defined by the lid 4, the wick 3 and the bottom 2.

In order to permit placing the container upside down for an unlimited time period with the lubricant retained in the container the lid 4 in FIG. 1 may have the shape of a cup 10 turned upside down as shown in FIG. 2 and having a volume corresponding to the amount of lubricant.

In FIG. 3 is shown an embodiment permitting the container to be positioned in any position with the lubricant retained in the container which is made possible by the lid having a radial part 11 and an axial part 12, which ends at a small distance from the bottom 2 and which parts form a ring-shaped space 13. The wick is attached to the part 12. When the container is inclined or positioned upside down all the lubricant is retained in space 13. A cup-shaped part 14 may be positioned in the tubular wick 3 as shown in FIG. 2.

In some applications the lubricant should be applied to the inner surface of a socket end 15 (FIG. 4) into which a tube provided with an outside sealing ring is to be inserted. In this case the device may have the shape shown in FIG. 4. The tubular wick 3 is attached to the outside of a cup 16 positioned with its perforated bottom portion attached to the bottom wall of the container. This container is similar to the container shown in FIG. 3 but the axial part 12 is provided with a flange 17 pressing against the tubular wick 3.

FIGS. 5 and 6 show an embodiment having an elongated shape. The container is provided with a lid or closure 21 in which an opening 22 is provided defined by a flange 23. The lid is provided with a guide member 24 adapted to support a wick 25 extending through the opening 22 to the interior of the container. Moreover, the lid is suitably provided with a protective collar 26 for protecting the protruding portion of the wick 25. A more important detail of this preferred embodiment of the invention is a resilient finger 27 or similar pressing member supported by the lid 21 or the container 1 forming an interspace to the applicator surface of the wick 25, which interspace is smaller than the wall thickness of the end portion of the tube 8 or 8', said finger 27 being adapted to press said surface of the end portion of the tube to be supplied with lubricant against the applicator surface of the wick 25.

I claim:

1. A hand-held liquid lubricant applicator device for applying a liquid lubricant to the surface of the end portion of a tube, said device comprising:
    an upwardly open, tubular container member for holding the liquid lubricant,
    an inverted, closed ended tubular insert member positioned within said tubular container member,
    a tubular applicator positioned within said container member and between said container member and said insert member, and
    circumferential flange means on one of said members and directed laterally towards said other member to compress said applicator between said members and within an narrow opening at a height above the level of the liquid carried by the container to provide an essentially closed reservoir for said liquid, preventing excess wetting of the applicator portion protruding from said opening and preventing spillage of liquid upon tipping of the container.

2. A device as claimed in claim 1, wherein said applicator member is cylindrical and said opening is ring-shaped.

3. The device as claimed in claim 1, wherein said flange means is carried by said insert member and projects radially outwards toward said container member.

4. The device as claimed in claim 1, wherein said container member comrises an annular, double wall container defining an annular cavity for reception of the said liquid including radially spaced inner and outer walls, the lower end of the inner wall of said container member is recessed, that is, lowered, to permit liquid to pass therethrough, and said insert member carries said circumferential flange which projects radially outwards to compress said tubular applicator against the radial inner wall of said container member.

5. The device as claimed in claim 1, wherein said container member comprises radially inner and radially outer spaced vertical walls defining an annular cavity for receiving liquid lubricant, and said circumferential flange means is carried by said radially inner wall of said container and projects radially inward toward said inverted closed end tubular insert member.

* * * * *